(12) United States Patent
Alzer et al.

(10) Patent No.: US 9,221,945 B2
(45) Date of Patent: Dec. 29, 2015

(54) LIQUID, ADHESION-PROMOTING ADDITIVE AND PROCESS FOR ITS PREPARATION

(71) Applicants: Heiko Alzer, Muelheim an der Ruhr (DE); Ingrid Heussen, Recklinghausen (DE); Sascha Herrwerth, Essen (DE); Thomas Veit, Hagen (DE); Michael Ewald, Marl (DE); Erika Retzlaff, Marl (DE); Tanja Joerres, Huenxe (DE); Annika Siebers, Kempen (DE)

(72) Inventors: Heiko Alzer, Muelheim an der Ruhr (DE); Ingrid Heussen, Recklinghausen (DE); Sascha Herrwerth, Essen (DE); Thomas Veit, Hagen (DE); Michael Ewald, Marl (DE); Erika Retzlaff, Marl (DE); Tanja Joerres, Huenxe (DE); Annika Siebers, Kempen (DE)

(73) Assignee: Evonik Industries AG, Essen (DE)

( * ) Notice: Subject to any disclaimer, the term of this patent is extended or adjusted under 35 U.S.C. 154(b) by 0 days.

(21) Appl. No.: 14/495,144

(22) Filed: Sep. 24, 2014

(65) Prior Publication Data
US 2015/0094419 A1    Apr. 2, 2015

(30) Foreign Application Priority Data
Sep. 27, 2013   (DE) .................. 10 2013 219 555

(51) Int. Cl.
| | |
|---|---|
| *C08G 63/52* | (2006.01) |
| *C08G 63/553* | (2006.01) |
| *C08L 67/02* | (2006.01) |
| *C08G 63/676* | (2006.01) |
| *C08G 63/692* | (2006.01) |

(52) U.S. Cl.
CPC .............. *C08G 63/52* (2013.01); *C08G 63/553* (2013.01); *C08G 63/676* (2013.01); *C08G 63/6928* (2013.01); *C08L 67/025* (2013.01)

(58) Field of Classification Search
CPC .... C08G 63/52; C08G 63/553; C08G 63/676; C08G 63/6928; C08L 67/025
See application file for complete search history.

(56) References Cited

U.S. PATENT DOCUMENTS

| 4,478,994 A | 10/1984 | Doerffel et al. |
| 6,143,841 A | 11/2000 | Spittka et al. |
| 6,639,017 B1 * | 10/2003 | Horold et al. ................ 525/168 |
| 8,420,731 B2 | 4/2013 | Cavaleiro et al. |
| 2005/0124780 A1 * | 6/2005 | Glockner et al. ............. 528/272 |
| 2011/0053079 A1 * | 3/2011 | Sacripante ............... 430/137.14 |
| 2012/0289673 A1 | 11/2012 | Tsai et al. |

FOREIGN PATENT DOCUMENTS

| EP | 114208 | 8/1984 |
| EP | 0 451 588 A2 | 10/1991 |
| EP | 0 451 588 A3 | 10/1991 |
| EP | 0 582 909 A1 | 2/1994 |
| EP | 934988 | 8/1999 |
| EP | 1 398 337 A2 | 3/2004 |
| GB | 1 488 415 | 10/1977 |
| GB | 1 604 689 | 12/1981 |

OTHER PUBLICATIONS

European Search Report issued Feb. 18, 2015 in Patent Application No. 14185880.3 (with English language Translation of Categories of Cited Documents).

* cited by examiner

*Primary Examiner* — Robert Jones, Jr.

(74) *Attorney, Agent, or Firm* — Oblon, McClelland, Maier & Neustadt, L.L.P.

(57) ABSTRACT

A polyester resin, comprising a polyester which comprises as esterified polymer units: at least one of an unsaturated dicarboxylic acid and an unsaturated polycarboxylic acid; and at least one of an alkoxylated diol and an alkoxylated polyol is provided. An adhesion-promoting additive comprising the polyester resin is also provided.

16 Claims, No Drawings

LIQUID, ADHESION-PROMOTING ADDITIVE AND PROCESS FOR ITS PREPARATION

CROSS REFERENCE TO RELATED APPLICATIONS

This application claims priority to German Application No. 102013219555.9, filed Sep. 27, 2013, the disclosure of which is incorporated herein by reference in its entirety.

BACKGROUND OF THE INVENTION

The present invention relates to polyesters based on dicarboxylic or polycarboxylic acids and diols or polyols, the polyesters comprising at least one unsaturated dicarboxylic or polycarboxylic acid and at least one alkoxylated diol or polyol, to processes for preparing them and to their use.

Unsaturated amorphous polyester resins (UP resins) are prepared by condensing saturated and unsaturated dicarboxylic acids or their anhydrides with diols. Their properties are dependent largely on the nature and proportion of the starting materials. The use of such unsaturated amorphous polyester resins for promoting adhesion is conventionally known as described in DE 2409800, EP 114208 and EP 934988. In the polyester resin it is generally carboxyl groups which mediate adhesion to the substrate, while remaining hydroxyl groups, for example, in two-component systems, or polymerizable double bonds in oxidatively drying or radiation-curing systems, are incorporated by reaction.

Used frequently as carriers of the polymerizable double bonds are $\alpha,\beta$-unsaturated acids, primarily maleic acid or its anhydride, or fumaric acid. Besides fumaric and maleic acid and the anhydride of the latter, examples of other polymerizable acids include citraconic, itaconic and/or mesaconic acid. Unsaturated diols are of minor importance. The reactivity of a polyester resin increases in line with the amount of double bonds therein, and in the event of high crosslinking, results in a relatively brittle end product. The desired brittleness is therefore adjusted by co-condensation with saturated aliphatic or aromatic dicarboxylic acids.

The individual grades of UP resin differ not only in the components used for their preparation, but also in the proportion of saturated to unsaturated acids, which determines the crosslinking density on polymerization; the degree of condensation, i.e. the molar mass; the acid number and OH number, i.e. the nature of the end groups in the chain molecules; the monomer content; and also the nature of the additives (Ullmann's Encyclopaedia of Industrial Chemistry, vol. A21, p. 217ff., 1992).

Also known, is the additional use of aromatic and/or aliphatic and/or cycloaliphatic monocarboxylic acids and/or dicarboxylic acids and/or polycarboxylic acids, such as, for example, phthalic acid, isophthalic acid, terephthalic acid, 1,4-cyclohexanedicarboxylic acid, succinic acid, sebacic acid, methyltetra- and methylhexahydrophthalic acid, hexahydrophthalic acid, tetrahydrophthalic acid, dodecanedioic acid, adipic acid, azelaic acid, isononanoic acid, 2-ethylhexanoic acid, pyromellitic acid and/or trimellitic acid.

Diol components used include linear and/or branched, aliphatic and/or cycloaliphatic and/or aromatic diols and/or polyols. Examples thereof are ethylene glycol, 1,2- and/or 1,3-propanediol, diethylene, dipropylene, triethylene and tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane and/or pentaerythritol and also bisphenol A, B, C, F, norbornylene glycol, 1,4-benzyldimethanol and -ethanol, 2,4-dimethyl-2-ethylhexane-1,3-diol.

In particular the use of Dicidol (tricyclodecanedimethanol, octahydro-4,7-methano-1H-indenedimethanol) as a diol component for the preparation of unsaturated polyester resins has been described in DE 953117, DE 2245110, DE 2721989, EP 114208 and EP 934988. Tricyclodecanedimethanol consists primarily of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane. The effect of adding Dicidol is to improve the tack-free state not only of the pure polyester resin but also later in the dried film, and to positively influence the storage stability of the resin. The through-drying of the coating is improved as well through the use of Dicidol.

Particularly in the case where Dicidol is used, however, the conventional polyester resins are solid resins. The metering of solids is often difficult, however, especially in the case of small and medium companies producing coating materials. The addition of solids has to be made by tipping sacks, in a physically demanding and inconvenient operation. Apart from the occupational physiology disadvantage, the resultant dusts also harbour safety problems, since solids can in principle lead to instances of dust explosion.

Solid resins can in principle also be metered in the form of a solution in organic solvents. Metering in dissolved form, however, adds the disadvantage that the user, to start with, has to accept the solvent mandated by the manufacturer. Moreover, the formulation especially of modern high-solids coatings, with a frequent necessity for a solvent fraction of up to 50 wt % in order to achieve a processable solution viscosity of the solid resin, is impossible.

DE 2402841 describes low-viscosity polyesters with low solvent content and also their reaction with amino resins to form impact-resistant coatings. Analogous teaching is contained in DE 2454025. The polyesters disclosed in both of these documents are based on bisphenol A.

It was an object of the present invention, therefore, to find an adhesion-promoting additive which improves properties of coating materials, such as the adhesion or the non-volatile fraction, for example, but with which at the same time it is possible to avoid the addition of further solvents. The adhesion-promoting additive ought, furthermore, to have a general activity in all binder systems.

SUMMARY OF THE INVENTION

This and other objects are achieved according to the present invention, the first embodiment of which includes a polyester resin, comprising a polyester which comprises as esterified polymer units:

at least one of an unsaturated dicarboxylic acid and an unsaturated polycarboxylic acid; and at least one of an alkoxylated diol and an alkoxylated polyol.

In a further embodiment the polyester resin of the present invention is free of a polyester comprising any of bisphenol A, B, C, F or derivatives thereof.

The present invention also includes an adhesion-promoting additive comprising the polyester resin according to the various embodiments of the present invention.

DETAILED DESCRIPTION OF THE PREFERRED EMBODIMENTS

In the following description, the words "a" and "an" and the like carry the meaning of "one or more." The phrases "selected from the group consisting of," "chosen from," and the like include mixtures of the specified materials. Terms such as "contain(s)" and the like are open terms meaning 'including at least' unless otherwise specifically noted.

In a first embodiment the present invention provides polyesters based on dicarboxylic or polycarboxylic acids and diols or polyols, the polyesters comprising at least one unsaturated dicarboxylic or polycarboxylic acid and at least one alkoxylated diol or polyol, preferably with the proviso that the polyesters contain no bisphenol A, B, C, F or derivatives thereof.

The polyesters according to the present invention have the advantage that by use of at least one alkoxylated alcohol component as a monomer building block, it is possible to obtain a polyester which is liquid at 23° C. under a pressure of 101 325 Pa. Surprisingly, therefore, the liquid aggregate state of an alkoxylated alcohol component, when used as a monomer building block, can be transferred to a solid unsaturated amorphous polyester resin. This is unexpected for the skilled person in particular because the transfer of this quality is in principle not always successful. Thus, for example, polymers made from liquid styrene and solid maleic anhydride, or homopolymers of liquid methyl methacrylate, are not liquid.

In contrast to the polyesters disclosed in DE 2402841 or DE 2454025, the polyesters of the invention preferably contain no bisphenol A, B, C, F or derivatives thereof. The neurotoxic and carcinogenic effect of bisphenol A is well known, and its use in baby's bottles made from polycarbonate, for example, has been prohibited since 2011. Beginning in April 2012, bisphenol A was again evaluated by the European Authorities for food safety, and further regulation of bisphenol A derivatives is likely. Moreover, the polyesters from DE 2402841 or DE 2454025 develop their effect—robustness and elasticity, for example—only when used as crosslinkers (diol component in two-component binder systems). The promotion of adhesion by addition of the polyester alone, as in the case of the present invention, is not described.

The polyesters of the invention are described in more detail below, with the term "polyester resins" being used interchangeably to describe the polyesters of the present invention.

The polyester resins of the invention are obtained by reaction of dicarboxylic or polycarboxylic acids and diols or polyols, using at least one unsaturated dicarboxylic or polycarboxylic acid and at least one alkoxylated alcohol component. The polyesters of the invention are therefore unsaturated polyesters.

As a starting acid component, the polyester resins of the invention comprise at least one unsaturated dicarboxylic or polycarboxylic acid, more particularly an α,β-unsaturated dicarboxylic or polycarboxylic acid. Preference is given to using citraconic, fumaric, itaconic, maleic and/or mesaconic acid as unsaturated dicarboxylic or polycarboxylic acid.

Besides the abovementioned unsaturated dicarboxylic or polycarboxylic acids, it may also be possible, additionally, for aromatic and/or aliphatic and/or cycloaliphatic monocarboxylic, dicarboxylic, polycarboxylic acids and/or phosphoric acids to be included. Examples of suitable aromatic and/or aliphatic and/or cycloaliphatic monocarboxylic, dicarboxylic and polycarboxylic acids include phthalic acid, isophthalic acid, terephthalic acid, 1,4-cyclohexanedicarboxylic acid, succinic acid, sebacic acid, methyltetra- and methylhexahydrophthalic acid, hexahydrophthalic acid, tetrahydrophthalic acid, dodecanedioic acid, adipic acid, azelaic acid, isononanoic acid, 2-ethylhexanoic acid, pyromellitic acid and/or trimellitic acid. Preferred are phthalic acid, hexahydrophthalic acid, tetrahydrophthalic acid, adipic acid, trimellitic acid and/or isophthalic acid.

Suitable phosphoric acids include phosphorus compounds selected from phosphoric acid, phosphoryl chloride and polyphosphoric acid ($P_2O_5$ in solution in $H_3PO_4$), preferably phosphoryl chloride or polyphosphoric acid ($P_2O_5$ in solution in $H_3PO_4$) and more preferably polyphosphoric acid ($P_2O_5$ in solution in $H_3PO_4$). A suitable polyphosphoric acid is, for example, the polyphosphoric acid identified by CAS No. 8017-16-1, with an 84 wt % content of $P_2O_5$ in solution in $H_3PO_4$, from Clariant.

For the purposes of the present invention, the acid components stated above as constituents of the polyester encompass the corresponding acid derivatives, more particularly anhydrides and/or alkyl esters, preferably methyl esters.

The proportions of the α,β-unsaturated acids in relation to the additional acid may vary from 5:1 to 1:5. Preferred ratios are from 4:1 to 1:4, the ratios present being more preferably from 2:1 to 1:2. The term "additional acid" in this case relates to both individual acids and mixtures of acids; the above-described ratio relates to the entirety of all non-α,β-unsaturated acids used.

The polyesters of the invention additionally comprise diols or polyols, there being necessarily at least one alkoxylated alcohol component present—in other words, at least one of the diols or polyols used for preparing the polyesters of the invention must be alkoxylated. An alkoxylated diol or polyol comprehends alcohols wherein at least one of the hydroxyl groups present in the diol or polyol has been reacted with an epoxide. The alkoxylated diol or polyol here may be based on linear and/or branched, aliphatic and/or cycloaliphatic and/or aromatic diols or polyols. Examples of linear and/or branched, aliphatic and/or cycloaliphatic diols or polyols are ethylene glycol, 1,2- and/or 1,3-propanediol, diethylene, dipropylene, triethylene and tetraethylene glycol, 1,2- and/or 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane and/or pentaerythritol, norbornylene glycol, 1,4-benzyldimethanol and -ethanol, 2,4-dimethyl-2-ethylhexane-1,3-diol and tricyclodecanedimethanol. Examples of aromatic diols or polyols are, in particular, dihydroxybenzenes such as pyrocatechol, resorcinol and hydroquinone. The alkoxylated diol or polyol may preferably be based on linear and/or branched, aliphatic and/or cycloaliphatic diols or polyols. Preferred diols or polyols include tricyclodecanedimethanol, 1,2-propanediol, cyclohexanedimethanol and neopentyl glycol. With particular preference the polyesters of the invention contain no bisphenol A, B, C, F.

The diol or polyol is alkoxylated with epoxides. Examples of epoxides with which the aforementioned diols or polyols are alkoxylated are ethylene oxide, propylene oxide, 1,2-butene oxide, 1,2-heptene oxide, 1,2-octene oxide, 1,2-nonene oxide, 1,2-undecene oxide, 1,2-dodecene oxide, 4-methyl-1,2-pentene oxide, styrene oxide, butadiene monoxide, isoprene monoxide, cyclopentene oxide and/or 2-ethyl-1,2-butene oxide. With particular preference, ethylene oxide and/or propylene oxide may be used.

A feature of the particularly preferred alkoxylated alcohol components is that these compounds satisfy the general formula (I)

$$R—O(CH_2CH_2O)_a(CH_2CHCH_3O)_b—H \qquad (I)$$

wherein

R=tricyclodecanedimethanol, 1,2-propanediol, cyclohexanedimethanol and neopentyl glycol, preferably tricyclodecanedimethanol a=0 to 20, preferably 5 to 12, and/or
b=0 to 20, preferably 5 to 12,
with the proviso that a+b≥1.

The fraction of the alkoxylated diols or polyols, based on the total amount of diols or polyols present in the polyester of the invention, is at least 60 mol %, preferably at least 75 mol % and more preferably at least 90 mol %.

The molar ratio of the alkoxylated diol or polyol to the acid component is preferably 0.5-2:1, more preferably 0.8-1.5:1. Very preferably the molar ratio of the alkoxylated diol or polyol to the acid component is from 1.0/1 to 1.1/1. "Acid component" in this context is understood as the entirety of all acids present.

The polyesters of the invention are flowable, preferably liquid, at 23° C. under a pressure of 101 325 Pa.

Furthermore, the polyesters of the invention preferably have an acid number, determined according to DIN EN ISO 2114, of between 1 and 150 mg KOH/g, more preferably between 1 and 100 and very preferably between 1 and 50 mg KOH/g. The acid number (AN) is understood as the amount of potassium hydroxide in mg that is needed to neutralize the acids present in one gram of substance. The sample under analysis is dissolved in dichloromethane and titrated with 0.1 N ethanolic potassium hydroxide against phenolphthalein.

Furthermore, the polyesters of the invention have in particular an OH number of between 1 and 200 mg KOH/g, preferably between 1 and 180 and more preferably between 1 and 150 mg KOH/g. In the context of the present invention, the OH numbers are determined according to DIN 53240-2. With this method, the sample is reacted with acetic anhydride in the presence of 4-dimethylamino-pyridine as catalyst, with the hydroxyl groups being acetylated. This reaction forms one molecule of acetic acid per hydroxyl group, while the subsequent hydrolysis of the excess acetic anhydride yields two molecules of acetic acid. The consumption of acetic acid is determined by titrimetry from the difference between the main value and a blank value, which has to be carried out in parallel.

The polyesters of the invention, which are flowable at 23° C. and 101 325 Pa, may have a viscosity of between 0 Pas and 3000 Pas, preferably between 1 Pas and 1000 Pas, more preferably between 1 Pas and 100 Pas, measured with an Anton Paar M102 rotary viscometer and the CP50/2 measurement geometry at 23° C. with a shear rate of $1/100$ s.

The polyesters of the invention have a numerical average of the relative molar mass Mn of between 500 and 5000 g/mol, preferably between 750 and 4000 g/mol, more preferably between 1000 and 3000 g/mol. These may be adjusted, in a manner familiar to the skilled person, via the molar ratios of the reactive groups in the raw materials. In the context of the present invention, the relative molar masses are determined by size exclusion chromatography (SEC). For this purpose, three columns from Merck (PS 400, 250*7 mm, PS 40, 250*7 mm, and PS 1,250*7 mm) with a particle size of 5 µm are combined in series. Following calibration, 20 µl of the polyester solution in tetrahydrofuran (c(polyester)=20 mg/ml) are injected at 40° C. with a Rheodyne 7125 injector and are analyzed with a flow rate of 1 ml/min (Waters HPLC pump 510) at 40° C. with degassed tetrahydrofuran as mobile phase and with a differential refractometer at 40° C. (Waters model 410). Evaluation is made after calibration against polystyrene standards, which is carried out in the manner described above. Polystyrene standards (standard 1 Mp 377 400, Mp 96 000, Mp 20 650, Mp 1300, Mp 162; standard 2 Mp 283 300, Mp 50 400, Mp 10 850, Mp 2930, Mp 980; standard 3 Mp 218 800, Mp 68 900, Mp 10 050, Mp 1940, Mp 580; Mp=molar mass at the peak maximum) are available commercially from Merck or from Polymer Laboratories.

In a particularly preferred embodiment, use is made as diol or polyol of the ethoxylated or propoxylated tricyclodecanedimethanol of the isomeric compounds 3,8-bis(hydroxymethyl)tricyclo[5.2.1.0$^{2,6}$]decane, 4,8-bis(hydroxymethyl)tricyclo[5.2.1.0$^{2,6}$]decane and 5,8-bis(hydroxymethyl)tricyclo[5.2.1.0$^{2,6}$]decane and, as dicarboxylic or polycarboxylic acids, of a mixture of fumaric acid and/or maleic acid or the anhydride thereof and adipic acid. The preferred molar ratio of alcohol to acid component is 0.9:1.1 to 1.1:0.9, with "alcohol or acid component" being understood in this context as the entirety of all acids and alcohols present. The polyesters of the invention in this composition generally have acid numbers of 1 to 150 mg KOH/g, preferably 1 to 100 mg KOH/g, more preferably 1-50 mg KOH/g, and OH numbers of 1 to 200 mg KOH/g, preferably 1-180 mg KOH/g, more preferably 1-150 mg KOH/g.

The polyesters of the invention may be prepared by semi-continuous or discontinuous esterification and condensation of the starting acids and starting alcohols, in a one-stage or two-stage procedure. The polyesters of the invention are preferably synthesized via a melt condensation. For this purpose, in accordance with the invention, the dicarboxylic or polycarboxylic acids and diols or polyols used are reacted. The polycondensation takes place in the melt at temperatures between 150 and 280° C. within from 3 to 30 hours. Initially, a major part of the amount of water which is released during the condensation is removed by distillation under atmospheric pressure. Subsequently, the rest of the water and also volatile diols or polyols are removed until the target molecular weight is obtained. Removal of these materials may optionally be accomplished under reduced pressure or by passing an inert gas stream through the reaction mixture. The reaction may additionally be accelerated by addition of an azeotrope former and/or a catalyst before or during the reaction. Suitable azeotrope formers include toluene and xylenes. Typical catalysts are organotitanium compounds or tin compounds such as tetrabutyl titanate or dibutyltin oxide. Catalysts based on other metals, such as zinc or antimony, as well as metal-free esterification catalysts may also be employed. Other additives and operating auxiliaries such as antioxidants or radical stabilizers and colour stabilizers may optionally be present.

Since the polyesters of the invention are flowable at 23° C. and 101 325 Pa, they are advantageously suitable for a full range of applications. In particular, the polyesters of the invention are suitable as an adhesion-promoting additive.

A further embodiment of the present invention includes the use of the polyesters of the invention as an adhesion-promoting additive, particularly in coatings. Coatings in the sense of the present invention include paints, varnishes, printing inks and print varnishes, in general liquid, paste-like or powder-form products which, when applied to a substrate, produce a surface coating having protective, decorative or other specific properties.

The inventors have surprisingly learned that there is a universal compatibility of the polyesters of the invention with other constituents of coating materials and/or adhesives and/or sealants. For example, the polyesters of the invention, in the context of their use as adhesion-promoting additives, may be mixed with polyacrylates, polyolefins, saturated and/or unsaturated polyesters and copolyesters, cellulose nitrate, phenol- and/or melamine-formaldehyde resins, phenolic resins, alkyd resins, acrylated polyesters, polyamides, phenol- and/or ketone-formaldehyde resins, ketonic resins, polyurethanes, polyureas, epoxy resins, polyvinyl chloride and its derivatives, such as co- and terpolymers, polyvinyl alcohols, PVDF, polyethers, silicone resins, chlorinated rubber, cyclo rubber, cellulose acetobutyrate.

The polyesters of the invention may be used, for example, with the aforementioned polymers in high-solids and very high-solids formulations, heat-curable, radiation-curable, air-drying (oxidatively and physically) coating materials, filling materials and/or sealants and adhesives, and are suitable as modifying resin for primers, surfacers, basecoats, one-coat topcoats, clearcoats, adhesives, sealants, traffic marking paints and anti-corrosion coatings.

Thus the polyesters of the invention may be used, in anti-corrosion paints, in which they form corrosion-resistant coats by radical reactions. As well as the increase in adhesion, there is also an improvement in the inter-coat adhesion with respect to bordering coats lying above and below. Coating materials which comprise an additive of the invention are notable, furthermore, for a high gloss and effective flow. In sprayed coating materials, moreover, there is a significant increase in the absorption of spray mist.

Further embodiments of the present invention include formulations comprising the polyesters of the invention. The formulations of the invention may include the polymers already stated above. Furthermore, the formulations may also comprise auxiliaries and adjuvants selected from inhibitors, water and/or organic solvents, neutralizing agents, surface-active substances, oxygen scavengers and/or radical scavengers, catalysts, light stabilizers, colour brighteners, photosensitizers, thixotropic agents, anti-skinning agents, defoamers, antistats, thickeners, thermoplastic additives, dyes, pigments, flame retardants, internal release agents, fillers and/or propellants.

In the stated formulations, the polyesters of the invention can be used as they are. Furthermore, further modifications are possible for hydrophobizing, hydrophilizing and functionalizing the polyesters of the invention. Hydrophobizing may be accomplished, for example, by a further reaction with fatty alcohols or fatty acids. Hydrophilization and functionalization may be achieved, for example, by a further reaction with phosphorus-containing or boron-containing compounds (phosphoric acid, polyphosphoric acid, boric acid).

The unsaturated polyester resin of the invention is especially suitable for use in formulations for producing varnishes (room temperature curing to baking curing, IR, UV and electron-beam curing), paints, printing inks, coating materials in general, laminating adhesives, generally in adhesives and sealants based on polyesters, melamines, epoxides, amides, polyethers, nitrocelluloses, cellulose acetobutyrates, polyvinyl butyrals, acrylates, polycarbonates and for improving these coating materials in respect of viscosity, adhesion, corrosion or gloss.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

EXAMPLES

Inventive Examples

Example 1

Alkoxylation of Tricyclodecanedimethanol with 4 mol of Ethylene Oxide 962.9 g (4.9 mol) of tricyclodecanedimethanol were heated to 80° C. to reduce the viscosity and were charged to a reactor with 18.5 g (0.15 mol) of KOH (45% strength). The reactor was subsequently rendered inert using nitrogen. It was evacuated (~20 mbar) and the mixture was heated to a temperature of 120° C., in order to remove the water over the course of an hour. Thereafter 865 g (19.6 mol) of ethylene oxide were added on over the course of about an hour. After a subsequent reaction time of a further hour at 120° C., the reaction product was cooled to 95° C. and evacuated for 30 minutes at <20 mbar in order to remove unreacted ethylene oxide. Subsequently, at this temperature neutralization with lactic acid (90% strength) was carried out. The lactic acid was added until the acid number was between 0.0-0.3 mg KOH/g. The product was subsequently filtered through a 1 μm filter.

Example 2

Unsaturated Polyester Resin with Ethoxylated Tricyclodecanedimethanol from Example 1

Adipic and fumaric acid (molar ratio 1:1) were reacted with ethoxylated tricyclodecanedimethanol from Example 1 in a molar ratio of 1:1.5 at 180° C. under a nitrogen atmosphere until an acid number of 31 mg KOH/g and an OH number of 119 mg KOH/g were reached. For this purpose, the fumaric acid was first esterified with ethoxylated tricyclodecanedimethanol from Example 1 over an hour, and then the adipic acid was added.

Mn=1000 g/mol

Mw=1800 g/mol

Glass transition temperature −38° C.

Viscosity at 23° C.: 9500 mPas.

Example 3

Alkoxylation of Tricyclodecanedimethanol with 10 mol of Ethylene Oxide 962.9 g (4.9 mol) of tricyclodecanedimethanol were heated to 80° C. to reduce the viscosity and were charged to a reactor with 18.5 g (0.15 mol) of KOH (45% strength). The reactor was subsequently rendered inert using nitrogen. It was evacuated (~20 mbar) and the mixture was heated to a temperature of 120° C., in order to remove the water over the course of an hour. Thereafter 2156 g (49 mol) of ethylene oxide were added on over the course of about an hour. After a subsequent reaction time of a further hour at 120° C., the reaction product was cooled to 95° C. and evacuated for 30 minutes at <20 mbar in order to remove unreacted ethylene oxide. Subsequently, at this temperature neutralization with lactic acid (90% strength) was carried out. The lactic acid was added until the acid number was between 0.0-0.3 mg KOH/g. The product is subsequently filtered through a 1 μm filter.

Example 4

Unsaturated Polyester Resin with Ethoxylated Tricyclodecanedimethanol from Example 3

Adipic and fumaric acid (molar ratio 1:1) were reacted with ethoxylated tricyclodecanedimethanol from Example 3 in a molar ratio of 1:1 at 180° C. under a nitrogen atmosphere until an acid number of 29 mg KOH/g and an OH number of 45 mg KOH/g were reached. For this purpose, the fumaric acid was first esterified with ethoxylated tricyclodecanedimethanol from Example 3 over an hour, and then the adipic acid was added.
Mn=2900 g/mol
Mw=10 300 g/mol
Glass transition temperature −48° C.
Viscosity at 23° C.: 18 400 mPas.

Example 5

Alkoxylation of Neopentyl Glycol with 5 mol of Propylene Oxide 509.6 g (4.9 mol) of neopentyl glycol were heated to 80° C. to reduce the viscosity and were charged to a reactor with 18.5 g (0.15 mol) of KOH (45% strength). The reactor was subsequently rendered inert using nitrogen. It was evacuated (~20 mbar) and the mixture was heated to a temperature of 120° C., in order to remove the water over the course of an hour. Thereafter 1423 g (24.5 mol) of propylene oxide were added on over the course of about an hour. After a subsequent reaction time of a further hour at 120° C., the reaction product was cooled to 95° C. and evacuated for 30 minutes at <20 mbar in order to remove unreacted propylene oxide. Subsequently, at this temperature neutralization with lactic acid (90% strength) was carried out. The lactic acid was added until the acid number was between 0.0-0.3 mg KOH/g. The product was subsequently filtered through a 1 μm filter.

Example 6

Unsaturated Polyester Resin with Propoxylated Neopentyl Glycol from Example 5

Adipic and fumaric acid (molar ratio 1:1) were reacted with propoxylated neopentyl glycol from Example 5 in a molar ratio of 1:1.1 at 180° C. under a nitrogen atmosphere until an acid number of 33 mg KOH/g and an OH number of 52 mg KOH/g were reached. For this purpose, the fumaric acid was first esterified with propoxylated neopentyl glycol from Example 5 over an hour, and then the adipic acid was added.
Mn=2200 g/mol
Mw=5400 g/mol
Glass transition temperature −54° C.
Viscosity at 23° C.: 4900 mPas.

Example 7

Unsaturated Polyester Resin with Ethoxylated Tricyclodecanedimethanol from Example 1 Using a Monocarboxylic Acid Fumaric and lauric acid (molar ratio 4:1) were reacted with ethoxylated tricyclodecanedimethanol from Example 1 in a molar ratio of 1:1 at 180° C. under a nitrogen atmosphere until an acid number of 33 mg KOH/g and an OH number of 45 mg KOH/g were reached.
Mn=1790 g/mol
Mw=5230 g/mol
Glass transition temperature −72° C.
Viscosity at 23° C.: 6500 mPas.

Example 8

Unsaturated Polyester Resin with Ethoxylated Tricyclodecanedimethanol from Example 1 Using Polyphosphoric Acid Fumaric acid, adipic acid and 85% polyphosphoric acid w/w (molar ratio 1:0.94:0.06) were reacted with ethoxylated tricyclodecanedimethanol from Example 1 in a molar ratio of 1:1 at 180° C. under a nitrogen atmosphere until an acid number of 27 mg KOH/g and an OH number of 52 mg KOH/g were reached. For this purpose, the fumaric acid was first esterified with ethoxylated tricyclodecanedimethanol from Example 1 over an hour, and then the polyphosphoric acid was added. After a further hour, the adipic acid was added.
Mn=1900 g/mol
Mw=5000 g/mol
Glass transition temperature −21° C.
Viscosity at 23° C.: 19 500 mPas.

Example 9

Alkoxylation of Tricyclodecanedimethanol with 5 mol of Ethylene Oxide 2802.3 g (14.28 mol) of tricyclodecanedimethanol were heated to 80° C. to reduce the viscosity and were charged to a reactor with 24.0 g (0.43 mol) of KOH (solid). The reactor interior was subsequently rendered inert using nitrogen. The reactor was evacuated (~20 mbar) and the mixture was heated to a temperature of 115° C. Thereafter 3242 g (73.5 mol) of ethylene oxide were added on over the course of about an hour. After a subsequent reaction time of a further hour at 115° C., the reaction product was cooled to 95° C. and evacuated for 30 minutes at <20 mbar in order to remove unreacted ethylene oxide. Subsequently, at this temperature neutralization of the reaction product with aqueous phosphoric acid (30% strength) was carried out, and water was removed by distillation at 115° C. and 20 mbar. The dry-distilled product was subsequently filtered through a 1 μm filter.

Example 10

Alkoxylation of Neopentyl Glycol with 5 mol of Ethylene Oxide 227.6 g (2.18 mol) of neopentyl glycol and 1.2 g (0.02 mol) of KOH (solid) were charged to a reactor. The reactor interior was subsequently rendered inert using nitrogen. The reactor was evacuated (~20 mbar) and the mixture was melted by heating to a temperature of 130° C. Thereafter 481 g (10.9 mol) of ethylene oxide were added on over the course of about two hours. After a subsequent reaction time of 1.5 hours at 115° C., the reaction product was cooled to 95° C. and evacuated for 30 minutes at <20 mbar in order to remove unreacted ethylene oxide. Subsequently, at this temperature, neutralization of the reaction product with aqueous phosphoric acid (30% strength) was carried out, and water was removed by distillation at 115° C. and 20 mbar. The dry-distilled product was subsequently filtered through a 1 μm filter.

Example 11

Unsaturated Polyester Resin with Ethoxylated Tricyclodecanedimethanol from Example 9

Adipic, mesaconic and fumaric acid (molar ratio 5:1:4) were reacted with ethoxylated tricyclodecanedimethanol from Example 9 in a molar ratio of 1:1.1 at 180° C. under a nitrogen atmosphere until an acid number of 29 mg KOH/g and an OH number of 58 mg KOH/g were reached. For this purpose, the fumaric acid and mesaconic acid were first esterified with ethoxylated tricyclodecanedimethanol from Example 9 over an hour, and then the adipic acid was added.
Mn=2000 g/mol
Mw=5100 g/mol
Glass transition temperature −41° C.
Viscosity at 23° C.: 27 000 mPas.

Example 12

Unsaturated Polyester Resin with Ethoxylated Tricyclodecanedimethanol from Example 9

Adipic, citraconic and fumaric acid (molar ratio 5:1:4) were reacted with ethoxylated tricyclodecanedimethanol from Example 9 in a molar ratio of 1:1.1 at 180° C. under a nitrogen atmosphere until an acid number of 29 mg KOH/g and an OH number of 58 mg KOH/g were reached. For this purpose, the fumaric acid and citraconic acid were first esterified with ethoxylated tricyclodecanedimethanol from Example 9 over an hour, and then the adipic acid was added.
Mn=1900 g/mol
Mw=4600 g/mol
Glass transition temperature −41° C.
Viscosity at 23° C.: 25 000 mPas.

Example 13

Unsaturated Polyester Resin with Ethoxylated Neopentyl Glycol from Example 10

Adipic, maleic and fumaric acid (molar ratio 2:1:1) were reacted with ethoxylated neopentyl glycol from Example 10 in a molar ratio of 1:1.4 at 180° C. under a nitrogen atmosphere until an acid number of 29 mg KOH/g and an OH number of 124 mg KOH/g were reached. For this purpose, the fumaric acid and maleic acid were first esterified with ethoxylated neopentyl glycol from Example 10 over an hour, and then the adipic acid was added.
Mn=1200 g/mol
Mw=2400 g/mol
Glass transition temperature −61° C.
Viscosity at 23° C.: 1000 mPas.

Example 14

Unsaturated Polyester Resin with Ethoxylated Neopentyl Glycol from Example 10

Adipic, itaconic and fumaric acid (molar ratio 10:1:9) were reacted with ethoxylated neopentyl glycol from Example 10 in a molar ratio of 1:1.4 at 180° C. under a nitrogen atmosphere until an acid number of 30 mg KOH/g and an OH number of 124 mg KOH/g were reached. For this purpose, the fumaric acid and itaconic acid were first esterified with ethoxylated neopentyl glycol from Example 10 over an hour, and then the adipic acid was added.
Mn=1200 g/mol
Mw=2200 g/mol
Glass transition temperature −62° C.
Viscosity at 23° C.: 930 mPas.

Example 15

Unsaturated Polyester Resin with Ethoxylated Neopentyl Glycol from Example 10

Adipic acid, dodecanedioic acid, phthalic anhydride, terephthalic acid, isononanoic acid and fumaric acid (molar ratio 10:3:1:1:1:4) were reacted with ethoxylated neopentyl glycol from Example 10 in a molar ratio of 1:1.5 at 180° C. under a nitrogen atmosphere until an acid number of 24 mg KOH/g and an OH number of 115 mg KOH/g were reached. For this purpose, the fumaric acid and terephthalic acid were first esterified with ethoxylated neopentyl glycol from Example 10 over an hour, and then the adipic acid, dodecanedioic acid, isononanoic acid and phthalic anhydride were added.
Mn=1300 g/mol
Mw=2700 g/mol
Glass transition temperature −63° C.
Viscosity at 23° C.: 960 mPas.

Example 16

Unsaturated Polyester Resin with Ethoxylated Neopentyl Glycol from Example 10

Succinic anhydride, azelaic acid, isophthalic acid, hexahydrophthalic anhydride, methylhexahydrophthalic anhydride and fumaric acid (molar ratio 6:6.7:1:1.1:1.2:4) were reacted with ethoxylated neopentyl glycol from Example 10 in a molar ratio of 1:1.5 at 180° C. under a nitrogen atmosphere until an acid number of 24 mg KOH/g and an OH number of 124 mg KOH/g were reached. For this purpose, the fumaric acid and isophthalic acid were first esterified with ethoxylated neopentyl glycol from Example 10 over an hour, and then the azelaic acid and the succinic, hexahydrophthalic and methylhexahydrophthalic anhydrides were added.
Mn=1200 g/mol
Mw=2400 g/mol
Glass transition temperature −62° C.
Viscosity at 23° C.: 1000 mPas.

Example 17

Unsaturated Polyester Resin with Ethoxylated Neopentyl Glycol from Example 10

Adipic acid, sebacic acid, trimellitic anhydride, polyphosphoric acid and fumaric acid (molar ratio 8:6:1:1:4) were reacted with ethoxylated neopentyl glycol from Example 10 in a molar ratio of 1:1.6 at 180° C. under a nitrogen atmosphere until an acid number of 25 mg KOH/g and an OH number of 129 mg KOH/g were reached. For this purpose, the fumaric acid was first esterified with ethoxylated neopentyl glycol from Example 10 over an hour, and then the adipic acid, sebacic acid, polyphosphoric acid and trimellitic anhydride were added.
Mn=1300 g/mol
Mw=2600 g/mol Glass transition temperature −64° C.
Viscosity at 23° C.: 990 mPas.

Example 18

Unsaturated Polyester Resin with Ethoxylated Neopentyl Glycol from Example 10

Adipic acid, tetrahydrophthalic anhydride, dimethyl phthalate, phosphoric acid and fumaric acid (molar ratio 10:4:1:1:4) were reacted with ethoxylated neopentyl glycol from Example 10 in a molar ratio of 1:1.5 at 180° C. under a nitrogen atmosphere until an acid number of 24 mg KOH/g and an OH number of 132 mg KOH/g were reached. For this purpose, the fumaric acid was first esterified with ethoxylated neopentyl glycol from Example 10 over an hour, and then the adipic acid, tetrahydrophthalic anhydride, dimethyl phthalate and phosphoric acid were added.
$M_n$=930 g/mol
$M_w$=1900 g/mol
Glass transition temperature −63° C.
Viscosity at 23° C.: 740 mPas.

Example 19

Unsaturated Polyester Resin with Ethoxylated Neopentyl Glycol from Example 10

Adipic acid, pyromellitic dianhydride, malic acid, lauric acid and fumaric acid (molar ratio 10:1:4:1:4) were reacted with ethoxylated neopentyl glycol from Example 10 in a molar ratio of 1:1.3 at 180° C. under a nitrogen atmosphere until an acid number of 26 mg KOH/g and an OH number of 101 mg KOH/g were reached. For this purpose, the fumaric acid was first esterified with ethoxylated neopentyl glycol from Example 10 over an hour, and then the adipic acid, pyromellitic dianhydride, malic acid and lauric acid were added.
$M_n$=1700 g/mol
$M_w$=4100 g/mol
Glass transition temperature −58° C.
Viscosity at 23° C.: 2400 mPas.

Example 20

Unsaturated Polyester Resin with Ethoxylated Neopentyl Glycol from Example 10

Adipic and fumaric acid (molar ratio 1:1) were reacted with ethoxylated neopentyl glycol from Example 10 in a molar ratio of 1:1.4 at 180° C. under a nitrogen atmosphere until an acid number of 20 mg KOH/g and an OH number of 117 mg KOH/g were reached. For this purpose, the fumaric acid was first esterified with ethoxylated neopentyl glycol from Example 10 over an hour, and then the adipic acid was added.
$M_n$=1400 g/mol
$M_w$=3100 g/mol
Glass transition temperature −61° C.
Viscosity at 23° C.: 1200 mPas.

Example 21

Unsaturated Polyester Resin with Ethoxylated Neopentyl Glycol from Example 10

Adipic and fumaric acid (molar ratio 3:1) were reacted with ethoxylated neopentyl glycol from Example 10 in a molar ratio of 1:1.2 at 180° C. under a nitrogen atmosphere until an acid number of 19 mg KOH/g and an OH number of 73 mg KOH/g were reached. For this purpose, the fumaric acid was first esterified with ethoxylated neopentyl glycol from Example 10 over an hour, and then the adipic acid was added.
$M_n$=2000 g/mol
$M_w$=4400 g/mol
Glass transition temperature −60° C.
Viscosity at 23° C.: 2000 mPas.

Example 22

Unsaturated Polyester Resin with Ethoxylated Tricyclodecanedimethanol from Example 9

Adipic and fumaric acid (molar ratio 3:1) were reacted with ethoxylated tricyclodecanedimethanol from Example 9 in a molar ratio of 1:1.2 at 180° C. under a nitrogen atmosphere until an acid number of 20 mg KOH/g and an OH number of 61 mg KOH/g were reached. For this purpose, the fumaric acid was first esterified with ethoxylated tricyclodecanedimethanol from Example 9 over an hour, and then the adipic acid was added.
$M_n$=2000 g/mol
$M_w$=4800 g/mol
Glass transition temperature −44° C.
Viscosity at 23° C.: 18 000 mPas.

Non-Inventive Examples

Example 23

Unsaturated Polyester Resin with Tricyclodecanedimethanol

Adipic and fumaric acid (molar ratio 1:1) were reacted with tricyclodecanedimethanol in a ratio of 1:1.1 at 180° C. under a nitrogen atmosphere until an acid number of 26 mg KOH/g and an OH number of 37 mg KOH/g were reached. For this purpose, the fumaric acid was first esterified with tricyclodecanedimethanol over an hour, and then the adipic acid was added.
$M_n$=1800 g/mol
$M_w$=4300 g/mol
Glass transition temperature 12° C.
Solid at 23° C.

Example 24

Unsaturated Polyester Resin with Neopentyl Glycol

Adipic and fumaric acid (molar ratio 1:1) were reacted with neopentyl glycol in a molar ratio of 1:1 at 180° C. under a nitrogen atmosphere until an acid number of 31 mg KOH/g and an OH number of 39 mg KOH/g were reached. For this purpose, the fumaric acid was first esterified with neopentyl glycol over an hour, and then the adipic acid was added.
$M_n$=2600 g/mol
$M_w$=6100 g/mol
Glass transition temperature −29° C.
Solid at 23° C.

Example 25

Unsaturated Polyester Resin with Dicidol

Adipic and maleic acid (molar ratio 1:1) were reacted with Dicidol in a ratio of 1:1.05 at 180° C. under a nitrogen atmosphere until an acid number of 26 mg KOH/g and an OH number of 37 mg KOH/g were reached. For this purpose, the maleic acid was first esterified with Dicidol over an hour, and then the adipic acid was added.

Mn=1800 g/mol
Mw=4300 g/mol
Glass transition temperature 12° C.
Solid at 23° C.

Use Examples

Use in an Anti-Corrosion Paint Based on a Short-Oil Alkyd

In an anti-corrosion paint based on a short-oil alkyd, portions of the main binder were replaced by the unsaturated polyester resin of the invention, in composition KA2, and also by a non-inventive unsaturated polyester resin in composition KA3. KA1 describes the composition of the blank sample.

|  |  | KA1 | KA2 | KA3 |
|---|---|---|---|---|
| Worleekyd 3001 | short-oil alkyd; 75% form | 33.1 | 30.0 | 30.0 |
|  | xylene | 12.3 | 13.1 | 11.6 |
|  | siccative Ca 10 | 0.2 | 0.2 | 0.2 |
|  | siccative Co 6 | 0.2 | 0.2 | 0.2 |
| Bentone 38 | Bentone swelling, 10% form | 3.1 | 3.1 | 3.1 |
| Heucophos ZP10 | zinc phosphate | 5.2 | 5.2 | 5.2 |
| Kronos 2190 | titanium dioxide | 12.4 | 12.4 | 12.4 |
| Printex 25 | carbon black | 0.0 | 0.0 | 0.0 |
| Finntalc M 15 SQ | talc | 7.7 | 7.7 | 7.7 |
| Millicarb OG | calcium carbonate | 16.6 | 16.6 | 16.6 |
| Microdol Extra KN | dolomite | 10.5 | 10.5 | 10.5 |
| From Example 6 | inventive polyester resin | 0.0 | 2.3 | 0.0 |
| From Example 23 | non-inventive polyester resin | 0.0 | 0.0 | 3.8 |
|  | methoxypropanol | 2.1 | 2.1 | 2.1 |
| Ascinin AntiSkin 0444 | anti-skinning agent | 0.4 | 0.4 | 0.4 |

The numerical figures relate to weight %

Use Example 1

The high viscosity of the formula KA1, at 1040 mPa·s, and KA3, at 930 mPa·s, measured using an Anton Paar M102 rotational viscometer and the CP50/2 measurement geometry at 23° C. and a shear rate of 1/100 s, was lowered on addition of the unsaturated polyester resin of the invention from Example 6, in formula KA2, to 630 mPa·s. As a result it was possible to increase the non-volatile fraction in the coating for comparable viscosity.

Use Example 2

The low gloss of the formula KA1, at 57 GU>60°, and KA3, at 42 GU>60°, measured according to DIN EN ISO 2813 on a glass plate, was improved by addition of the unsaturated polyester resin of the invention from Example 6, to 80 GU>60°.

Use Example 3

The adhesion of formula KA1, with characteristic cross-cut value 3, and KA3, with characteristic cross-cut value 2, measured according to DIN EN ISO 2409, cut with a cutting implement; 1 mm cut spacing; removal with Tesa adhesive tape No. 4651, was improved by addition of the unsaturated polyester resin of the invention from Example 6, to a characteristic cross-cut value of 1.
Substrate: steel plate
Dry film thickness: 55 μm
Ageing: 6 weeks

Use Example 4

In a salt spray test according to DIN EN ISO 9227 (40° C.; 0.5% NaCl; pH 6.5-7.2; travel measured over an 80 cm² surface: 2 ml/h; set-up angle of the test specimens: 20°), it was possible to improve the outcome, with resultant medium-sized blisters in the case of formulas KA1 and KA3, through addition of the unsaturated polyester resin of the invention from Example 6, to a blister-free outcome for the formula KA2.

Application in a 2-Component PU One-Coat Paint Based on a Polyisocyanate-Crosslinking Acrylate Resin In a 2-component PU one-coat paint based on a polyisocyanate-crosslinking acrylate resin, portions of the main binder were replaced by the unsaturated polyester resin of the invention, in composition PU2, and by a non-inventive unsaturated polyester resin, in composition PU3. PU1 describes the composition of the blank sample.

|  |  | PU1 | PU2 | PU3 |
|---|---|---|---|---|
| Synthalat A085 | acrylate resin | 37.6 | 34.2 | 34.2 |
| Kronos 2310 | titanium dioxide | 18.0 | 18.0 | 18.0 |
| Blancfixe micro | barium sulphate | 15.0 | 15.0 | 15.0 |
| Talkum IT extra | talc | 7.0 | 7.0 | 7.0 |
|  | dispersion aid Ca 4 | 1.0 | 1.0 | 1.0 |
| Bentone 38 | Bentone swelling 10% strength | 4.0 | 4.0 | 4.0 |
|  | xylene | 5.0 | 5.0 | 5.0 |
|  | solvent naphtha | 3.0 | 4.3 | 3.0 |
| From Example 4 or 6 | inventive polyester resin | 0.0 | 2.1 | 0.0 |
| From Example 25 | non-inventive polyester resin; 60% strength in xylene | 0.0 | 0.0 | 3.4 |
|  | methoxypropyl acetate | 8.0 | 8.0 | 8.0 |
| Vestanat 2640 MX | polyisocyanate | 8.0 | 8.0 | 8.0 |

The Numerical Figures Relate to Weight %

Use Example 5

The high viscosity of the formula PU3, at 715 mPa·s, measured using an Anton Paar M102 rotational viscometer and the CP50/2 measurement geometry at 23° C. and a shear rate of 1/100 s, was lowered on addition of the unsaturated polyester resin of the invention from Example 4, in formula PU2, to 330 mPa·s. As a result it was possible to increase the non-volatile fraction in the coating for comparable viscosity.

Use Example 6

The low gloss of the formula PU1, at 67 GU>60°, and PU3, at 16 GU>60°, measured according to DIN EN ISO 2813 on a glass plate, was improved by addition of the unsaturated polyester resin of the invention from Example 4, in formula PU2, to 74 GU>60°.

Use Example 7

The adhesion of formula PU1, with characteristic cross-cut value 4, and PU3, with characteristic cross-cut value 4, measured according to DIN EN ISO 2409, cut with a cutting implement; 1 mm cut spacing; removal with Tesa adhesive tape No. 4651, was improved by addition of the unsaturated polyester resin of the invention from Example 6, to a characteristic cross-cut value of 1.
Substrate: Sendzimir-galvanized steel plate
Dry film thickness: 50 μm
Ageing: 6 weeks

Use Example 8

The resistance with respect to hand cream was improved relative to the formula PU1 (slight dissolution and softening of the coating) by addition of the unsaturated polyester resin of the invention from Example 4, in the case of formula PU2, to give a coating surface which was unattacked.

Cream: Nivea Soft & Intensive
Exposure time: 48 h at RT

Application in a 1-component baking varnish based on a melamine-crosslinking polyester resin In a 1-component baking varnish based on a melamine-crosslinking polyester resin, portions of the main binder were replaced by the unsaturated polyester resin of the invention, in composition EB2, and by a non-inventive unsaturated polyester resin, in composition EN3. EB1 describes the composition of the blank sample.

|  |  | EB1 | EB2 | EB3 |
|---|---|---|---|---|
| Dynapol LH 831/24 | polyester resin | 41.05 | 38.85 | 38.85 |
| Aerosil 200 | fumed silica | 0.32 | 0.32 | 0.32 |
| Kronos 2310 | titanium dioxide | 31.73 | 31.73 | 31.73 |
|  | solvent naphtha 100 | 3.18 | 3.18 | 3.18 |
| Cymel 303 | melamine resin | 8.06 | 8.06 | 8.06 |
| Nacure 2500 | catalyst | 0.42 | 0.42 | 0.42 |
| Tego Flow 370 | flow control additive | 1.06 | 1.06 | 1.06 |
|  | butyl glycol | 4.24 | 5.27 | 4.24 |
| From Example 20 or 21 | inventive polyester resin | 0.0 | 1.54 | 0.0 |
| From Example 25 | non-inventive polyester resin; 60% strength in xylene | 0.0 | 0.0 | 2.57 |
|  | solvent naphtha 100 | 5.31 | 5.31 | 5.31 |
|  | solvent naphtha 150 | 4.24 | 4.24 | 4.24 |

The Numerical Figures Relate to Weight %

Use Example 9

The high viscosity of the formula EB3, at 580 mPa·s, measured using an Anton Paar M102 rotational viscometer and the CP50/2 measurement geometry at 23° C. and a shear rate of $1/100$ s, was lowered on addition of the unsaturated polyester resin of the invention from Example 20, in formula EB2, to 366 mPa·s. As a result it was possible to increase the non-volatile fraction in the coating for comparable viscosity.

Use Example 10

The adhesion of formula EB1, with characteristic cross-cut value 4, and EB3, with characteristic cross-cut value 4, measured according to DIN EN ISO 2409, cut with a cutting implement; 1 mm cut spacing; removal with Tesa adhesive tape No. 4651, was improved by addition of the unsaturated polyester resin of the invention from Example 21, in formula EB2, to a characteristic cross-cut value of 1.

Substrate: Sendzimir-galvanized steel plate
Dry film thickness: 37 μm
Ageing: 6 weeks

Use Example 11

The adhesion of formula EB1, with characteristic cross-cut value 4, measured according to DIN EN ISO 2409, cut with a cutting implement; 1 mm cut spacing; removal with Tesa adhesive tape No. 4651, was improved by addition of the unsaturated polyester resin of the invention from Example 21, in formula EB2, to a characteristic cross-cut value of 1.

Substrate: Glass plate
Dry film thickness: 37 μm
Ageing: 24 hours

Application in a 2-Component EP One-Coat Paint Based on an Amine-Crosslinking Epoxy Resin In a 2-component EP one-coat paint based on an amine-crosslinking epoxy resin, portions of the main binder were replaced by the unsaturated polyester resin of the invention, in composition EP2, and by a non-inventive unsaturated polyester resin, in composition EP3. EP1 describes the composition of the blank sample.

|  |  | EP1 | EP2 | EP3 |
|---|---|---|---|---|
| Epikote 834-X-80 | epoxy resin | 35.24 | 31.72 | 31.72 |
| Spezialschwarz 250 | carbon black | 0.85 | 0.85 | 0.85 |
| Heucophos ZPA | zinc phosphate | 4.25 | 4.25 | 4.25 |
| Finntalc M20SL | talc | 10.19 | 10.19 | 10.19 |
| Kronos 2310 | titanium dioxide | 15.29 | 15.29 | 15.29 |
| Blancfixe micro | barium sulphate | 11.46 | 11.46 | 11.46 |
|  | xylene | 7.64 | 8.34 | 6.46 |
| From Example 20 or 22 | inventive polyester resin | 0.00 | 2.82 | 0.00 |
| From Example 25 | non-invention polyester resin; 60% strength in xylene | 0.00 | 0.00 | 4.70 |
| Epikure 3155 | aminic hardener | 15.07 | 15.07 | 15.07 |

The Numerical Figures Relate to Weight %

Use Example 12

The high viscosity of the formula EB1, at 1170 mPa·s, and of the formula EB3, at 1750 mPa·s, measured using an Anton Paar M102 rotational viscometer and the CP50/2 measurement geometry at 23° C. and a shear rate of $1/100$ s, was lowered on addition of the unsaturated polyester resin of the invention from Example 20, in formula EP2, to 744 mPa·s. As a result it was possible to increase the non-volatile fraction in the coating for comparable viscosity.

Use Example 13

The degree of gloss of the formula EP1, at 93 GU>85°, measured according to DIN EN ISO 2813 on a glass plate, was improved by addition of the unsaturated polyester resin of the invention from Example 22, in formula EP2, to 99 GU>85°.

Numerous modifications and variations on the present invention are possible in light of the above teachings. It is therefore to be understood that within the scope of the appended claims, the invention may be practiced otherwise than as specifically described herein.

The invention claimed is:

1. A polyester resin, comprising a polyester which comprises as esterified polymer units:
   at least one of an unsaturated dicarboxylic acid and an unsaturated polycarboxylic acid; and
   at least one of an alkoxylated diol and an alkoxylated polyol of the formula (I)

$$R\text{—}O(CH_2CH_2O)_a(CH_2CHCH_3O)_b\text{—}H \qquad (I)$$

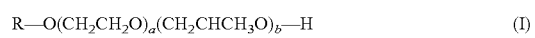

wherein
R=tricyclodecanedimethanol, 1,2-propanediol, cyclohexanedimethanol and neopentyl glycol
a=0 to 20;
b=0 to 20;

with the proviso that a+b≥1;
wherein said polyester is a liquid at 23° C. and a pressure of 101 325 Pa.

2. The polyester resin according to claim 1, wherein the polyester resin is free of a polyester comprising any of bisphenol A, B, C, F or derivatives thereof.

3. The polyester resin according to claim 1, wherein the at least one of an unsaturated dicarboxylic acid and an unsaturated polycarboxylic acid is an unsaturated dicarboxylic or poly-carboxylic acid selected from the group consisting of citraconic acid, fumaric acid, itaconic acid, maleic acid and mesaconic acid.

4. The polyester resin according to claim 1, wherein the polyester further comprises as an esterified polymer unit, an acid selected from the group consisting of an aromatic, aliphatic or cycloaliphatic monocarboxylic acid, an aromatic, aliphatic or cycloaliphatic dicarboxylic acid, an aromatic, aliphatic or cycloaliphatic polycarboxylic acid and a phosphoric acid.

5. The polyester resin according to claim 1, wherein the at least one of an alkoxylated diol and an alkoxylated polyol is alkoxylated with an agent selected from the group consisting of ethylene oxide, propylene oxide, 1,2-butene oxide, 1,2-heptene oxide, 1,2-octene oxide, 1,2-nonene oxide, 1,2-undecene oxide, 1,2-dodecene oxide, 4-methyl-1,2-pentene oxide, styrene oxide, butadiene monoxide, isoprene monoxide, cyclopentene oxide and/or 2-ethyl-1,2-butene oxide.

6. The polyester resin according to claim 1, wherein a molar ratio of the alkoxylated diol or polyol to the dicarboxylic or polycarboxylic acids is from 1:2 to 2:1.

7. The polyester resin according to claim 1, wherein an acid number of the polyester, determined according to DIN EN ISO 2114, is from 1 to 150 mg KOH/g.

8. The polyester resin according to claim 1, wherein an OH number of the polyester, determined according to DIN 53240-2, is from 1 to 200 mg KOH/g.

9. The polyester resin according to claim 1, wherein the polyester comprises as esterified polymer units:
at least one of ethoxylated or propoxylated tricyclodecanedimethanol; and
a mixture of fumaric acid and/or maleic acid and adipic acid.

10. The polyester resin according to claim 9, wherein the ethoxylated or propoxylated tricyclodecanedimethanol comprises at least one selected from the group consisting of ethoxylated or propoxylated 3,8-bis(hydroxymethyl)tricyclo[5.2.1.0$^{2,6}$]decane, ethoxylated or propoxylated 4,8-bis(hydroxymethyl)tricyclo[5.2.1.0$^{2,6}$]decane and ethoxylated or propoxylated 5,8-bis(hydroxymethyl)tricyclo[5.2.1.0$^{2,6}$]decane.

11. An adhesion-promoting additive comprising the polyester resin according to claim 1.

12. A formulation comprising the polyester resin according to claim 1.

13. The formulation according to claim 11, further comprising at least one auxiliary or adjuvant selected from the group consisting of an inhibitor, water, an organic solvent, a neutralizing agent, a surface-active substance, an oxygen scavenger, a radical scavenger, a catalyst, a light stabilizer, a color brightener, a photosensitizer, a thixotropic agent, an anti-skinning agent, a defoamer, an antistat, a thickener, a thermoplastic additive, a dye, a pigment, a flame retardant, an internal release agent, a filler and a propellant.

14. The polyester resin according to claim 1, wherein a=5 to 12.

15. The polyester resin according to claim 1, wherein b=5 to 12.

16. The polyester resin according to claim 1, wherein R=tricyclodecanedimethanol.

* * * * *